Feb. 9, 1943.   H. M. DODGE   2,310,405
OIL SEAL
Filed Sept. 19, 1940

INVENTOR
*Howard M. Dodge*
BY
*Evans + McCoy*
ATTORNEYS

Patented Feb. 9, 1943

2,310,405

UNITED STATES PATENT OFFICE 2,310,405

OIL SEAL

Howard M. Dodge, Wabash, Ind., assignor to The General Tire & Rubber Company, Summit, Ohio, a corporation of Ohio Application September 19, 1940, Serial No. 357,427

1 Claim. (Cl. 288—2)

This invention relates to oil and grease retainers. It particularly relates to a grease or oil retainer which may be adjusted to compensate for wear and which is especially adapted for the sealing of piston or plunger type pumps, et cetera.

It is an object of the present invention to provide an oil or grease retainer suitable for preventing fluid leakage around rotating and sliding shafts and which can be adjusted to apply the desired sealing pressure against said shafts.

It is another object of the present invention to provide an adjustable fluid seal which is adapted to seal the opening between an unmachined housing surface and the shaft and which has a rubber sealing element firmly supported by metal members.

It is a further object of the present invention to provide a fluid seal having a rubber sealing element supported by metal members, which seal may be adjusted to seal openings between shafts and housings having slightly different diameters.

Other objects will be apparent from the following description of the invention which is illustrated by the drawing in which.

Figure 1:
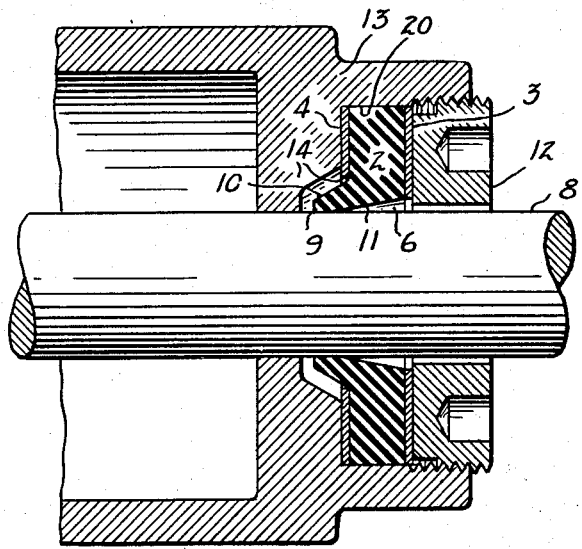
Figure 1 is a sectional view of stuffing box, showing a seal embodying the present invention disposed therein.

Referring more particularly to the drawing wherein like elements are designated by like letters and numerals of reference throughout the several views, my improved fluid seals have a molded sealing element 2 of a deformable oil resistant synthetic rubber or of a rubber-like material supported by rigid metal supporting members 3 and 4 which are adapted to be moved laterally relative to each other by the application of sufficient lateral pressure.

The molded sealing element has an annular body portion 5 with a frusto-conical opening 6 centrally thereof and an integral, annular, frusto-conical sealing lip 7 disposed around said opening at the end having the smaller diameter. The opening 6 is adapted to receive a shaft 8 of a diameter which corresponds substantially to that of the opening 6 so that the complete periphery of the shaft engaging tip 9 may contact the shaft.

The body portion 5 is supported by the annular metal supporting members or rings 3 and 4. Openings in the members 3 and 4 register with the opening 6 in the sealing element 2. The opening 14 in the member 4 adjacent the lip 7 is of larger diameter than that in the supporting member 3 so the lip 7 may protrude therethrough. The metal supporting rings are adhesively attached to the body member 5 by a suitable rubber-to-metal adhesive, such for example as a thermoplastic rubber isomer or preferably an isomer of certain addition products of rubber having less in saturation than simple rubber addition products of the same composition. A particularly desirable adhesive is available under the trade name Reanite and is described in application Serial Number 292,699, filed August 30, 1939.

The annular sealing lip 7 projects beyond the planes of the body portion 5 and through and beyond the plane of the metal supporting ring 4. The sealing lip is adapted to engage the piston or shaft 8 and in its normal molded shape the opening 6 adjacent the tip 9 is preferably of somewhat smaller diameter than the diameter of the shaft, so that a slight pressure is exerted against the shaft by the tip 9. However the smallest diameter of the opening 6 may be molded equal to or slightly larger than the shaft diameter and adjustments made by compressing the body portion 5 to a greater or less degree, as hereinafter described.

The lip 7 has greater thickness at its base, which is the point of juncture with the body 5, and it is preferably trimmed to substantial thickness at its end. A vertical surface 16 is thus provided, which surface connects the surfaces 10 and 11. The thickness of the lip adjacent its end should be sufficient to provide substantial rigidity so that the sealing tip 9 may be forced against the shaft with substantial pressure. The outer substantially conical surface 10 of the lip 7 and the inner conical surface 11 of the opening 6 form oblique angles with respect to the shaft 8, and converge but have insufficient length to intersect.

The body portion 5 has substantial thickness. It is sufficiently thick to be deformed under moderate lateral pressure so as to cause the integrally molded shaft engaging lip 7 to be compressed and tend to decrease the smallest diameter of the frusto-conical opening 6. By compressing the body portion 5 the pressure and friction between the shaft and said lip may therefore be varied as desired.

The body portion also has sufficient thickness to permit a substantial increase in its maximum diameter when squeezed with moderate pressure.

A thickness of ¼ inch or more is desirable in most seals.

The seal may be disposed in a stuffing box comprising a suitable housing 13 which may be bored to receive the shaft, counter-bored to receive the seal, and threaded to receive the collar 12. By turning the collar 12 with respect to the housing the body 5 may be compressed. Since the members 3 and 4 are adhered to the body 5, deformation of the rubber-like material adjacent these members is prevented and the body 5 tends to deform as indicated by the broken lines of Figures 2 and 3. The tension in the surface 6 caused by its increased length due to the deformation thereof tends to move the tip 9 toward the shaft as the side members 3 and 4 are moved together.

Figure 2:
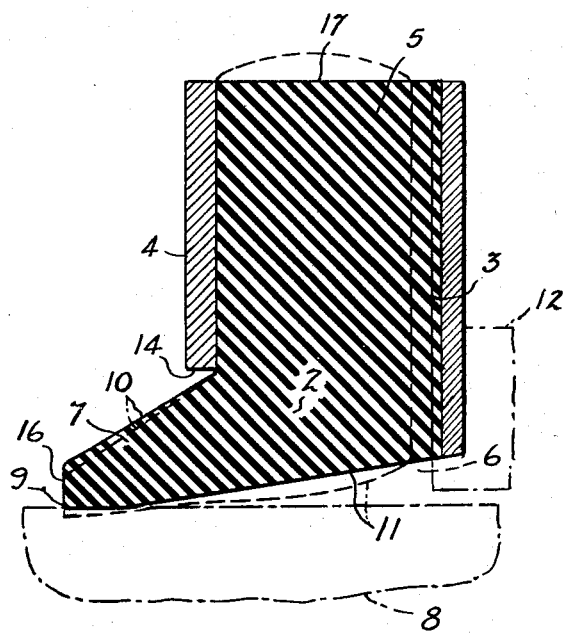
Fig. 2 is a sectional view through a portion of a fluid seal in contact with a shaft, the broken lines illustrating the unrestrained shape of the sealing element when it is deformed by laterally squeezing the side members.

In the modification of Figure 2 wherein the outer periphery of the body portion 5 is not enclosed by supporting members, movement of the side members 3 and 4 toward each other causes the unrestrained surface 17 to move outward against the surface 20 of the housing. Since the diameter of the seal may be thus increased by lateral pressure the modification of Fig. 2 enables one to obtain a leakproof joint against rough surfaces. It is therefore preferred when it is desired to utilize the seal in housings having slightly variable diameters or in housings wherein the surface 20 has not been machined or ground.

The fluid seals of this invention, while applicable to rotating shafts and the like, are particularly suitable for sealing the fluid in hydraulic brake systems and in reciprocating type pumps. In all cases pressure of the lip 7 on the shaft or piston can be varied for friction and for wear.

It is to be understood that variations and modifications of the specific device herein shown and described for purposes of illustration, may be made without departing from the spirit of the invention.

I claim:

A fluid seal for sealing a space between relatively movable members, comprising an annular molded sealing element of a deformable synthetic rubber compound, which sealing element has an annular deformable body portion, a preformed laterally extending, annular flangelike frusto-conical sealing lip and substantially non-expansible annular metal supporting members adhesively attached to said body portion and enclosing the sides of said body portion, the outer periphery of said body portion being free to move radially and enlarge its diameter to expand and form a seal against one of said relatively movable members when pressure is applied to said supporting members, each of said supporting members having an opening, said lip extending beyond the plane of said body portion and protruding through and beyond the registering opening of one of said annular supporting members, whereby movement of the supporting members toward each other causes inward radial movement of the sealing lip.

HOWARD M. DODGE.